(12) United States Patent
Dalrymple

(10) Patent No.: US 9,861,073 B2
(45) Date of Patent: Jan. 9, 2018

(54) OUTRIGGER

(76) Inventor: Roger Kenneth Roy Dalrymple, Bulls (NZ)

( * ) Notice: Subject to any disclaimer, the term of this patent is extended or adjusted under 35 U.S.C. 154(b) by 911 days.

(21) Appl. No.: 14/125,877

(22) PCT Filed: Jun. 14, 2012

(86) PCT No.: PCT/NZ2012/000098
§ 371 (c)(1),
(2), (4) Date: Jun. 17, 2014

(87) PCT Pub. No.: WO2012/173500
PCT Pub. Date: Dec. 20, 2012

(65) Prior Publication Data
US 2015/0034895 A1    Feb. 5, 2015

(30) Foreign Application Priority Data

Jun. 14, 2011    (NZ) ........................................ 593455

(51) Int. Cl.
*E04H 17/06*    (2006.01)
*A01K 3/00*    (2006.01)
*E04H 17/24*    (2006.01)

(52) U.S. Cl.
CPC .............. *A01K 3/005* (2013.01); *E04H 17/24* (2013.01)

(58) Field of Classification Search
CPC .......... A01K 3/00; A01K 3/005; E04H 17/04; E04H 17/06; E04H 17/10
See application file for complete search history.

(56) References Cited

U.S. PATENT DOCUMENTS 1,653,767 A * 12/1927 Hill ......................... E04H 17/24
248/351
3,671,017 A * 6/1972 Sachs ...................... E04H 17/10
256/47
4,436,284 A * 3/1984 Varela-Hernandez .. E04H 17/06
256/22

FOREIGN PATENT DOCUMENTS

| AU | 2009201393 A1 | 10/2009 | |
| WO | 2009/120098 A1 | 10/2009 | |
| WO | WO 2010/080880 | * 7/2010 | ............... A01K 3/00 |
| WO | 2010/095961 A1 | 8/2010 | |

OTHER PUBLICATIONS

International Search Report and Written Opinion dated Nov. 1, 2012, issued in PCT Application No. PCT/NZ2012/000098, filed Jun. 14, 2012.

(Continued)

*Primary Examiner* — Michael P Ferguson
(74) *Attorney, Agent, or Firm* — Workman Nydegger

(57) ABSTRACT

An outrigger for supporting an elongate electrical conductor from a support. The outrigger has a first elongate limb 11 and a second elongate limb 12. An elongate electric conductor 13 is suspended from a first support device 14 located at a distal end 15 of the first limb 11. In use, the second limb 12 is attached by a first connector 16 to a length portion of an elongate element 18 so that the second limb 12 is rotatable about an axis that is parallel to a longitudinal axis of the elongate element 18. The first limb 11 is connected to the second limb 12 by a second connector 24. The first limb 11 is rotatable relative to the second limb 12 about a pivot axis of the second connector 24. A restrictor 36 limits rotation of the first limb with respect to the second limb about the pivot axis.

10 Claims, 9 Drawing Sheets

(56) References Cited

OTHER PUBLICATIONS

Examination Report dated Jun. 23, 2011, issued in Australian Application No. 593455, filed Jun. 14, 2011.
Website for Electric Fence, Electric Fences, Outriggers, dated Jul. 7, 2011, 2 pages.

* cited by examiner

OUTRIGGER

FIELD OF INVENTION

The present invention relates to animal control and in particular to an outrigger for mounting an electrified 'hot wire' or other electric conductor to a fence or other support. The outrigger is suited to the enclosure and control of farmed animals. In use, the outrigger may be supported on a non-electric fence, for example by the generally horizontal wires of a post, wire and batten fence. A plurality of the outriggers can be used to convert a non-electric fence into an electrified fence for protecting the fence by deterring stock from pushing against or through the fence. The outriggers may also be used to support electrified conductors for controlling animals in a feeding zone and particularly for reducing the spoilage of feed such as by trampling and contamination by the animals.

BACKGROUND

It is known to offset an electrified conductor from a supporting fence. Various forms of standoffs, outriggers or offsets are mounted to parallel fence wires or to fence posts of a post and batten fence. An insulated pigtail, clip or other retainer, at a distal end of the standoff, outrigger or offset, carries an electric conductor, such as a wire or tape.

Single-sided outriggers carry an electric conductor spaced outwardly at a distance from one side of the fence. Double-sided outriggers carry a pair of electric conductors, with one electric conductor spaced outwardly at a distance from each side of the fence.

When known electric fence outriggers are moved out of position, such as when hit by animals or farm vehicles, the outriggers can remain permanently misshapen or misaligned, thereby reducing, or in some cases removing, the distance that the electrified conductor is offset from the supporting fence. In some cases this can short circuit the electrified conductor to ground potential. This can severely reduce or cancel the effectiveness of the electric fence, not just at the site of the misaligned outrigger but in some cases over a substantial length, or even the entire length, of electric fencing powered from the same fence energiser. It can be a time consuming exercise for farmers to monitor, locate and re-shape or re-align the affected outriggers.

SUMMARY OF INVENTION

An object of at least one embodiment of the invention is to provide an outrigger for supporting an electric conductor, or a method of using an outrigger, or a method of feeding animals using an outrigger, or at least to provide the public with a useful choice.

In a first aspect the invention may be broadly said to be an outrigger for supporting an elongate electrical conductor at a distance outward from a support, the outrigger comprising:
 a first elongate limb;
 a first support device at a distal end of the first limb for suspending therefrom a length portion of the elongate electrical conductor;
 a second elongate limb;
 a first connector attached to, or integral with, the second limb for connecting the second limb to a length portion of an elongate element of the support so that the second limb is rotatable about an axis that is parallel to a longitudinal axis of the length portion of the elongate element;
 a second connector spaced apart from the first connector, the second connector pivotally connecting the first limb to the second limb, the first limb being rotatable with respect to the second limb about a pivot axis of the second connector, the pivot axis being transverse to both the first limb and the second limb; and
 a restrictor which limits rotation of the first limb with respect to the second limb about the pivot axis, the restrictor preventing relative rotation of the first limb in one direction of rotation toward the second limb beyond a limit position.

Preferably, the limit position of the first limb is at least approximately orthogonal to the second limb.

Preferably, the pivot axis of the second connector is substantially parallel to the longitudinal axis of the length portion of the elongate element when the second limb is connected by the first connector to the portion of the elongate element.

Preferably, the first connector and second connector are spaced apart from one another by a distance that is adjustable. More preferably, at least one of the first connector and the second connector is movably attached to the second limb.

Preferably, the first connector comprises a body, the second limb is attached to the body of the first connector, and the portion of the elongate element is locatable in a groove in the body of the first connector, so that the body of the first connector and the second limb are rotatable about the longitudinal axis of the length portion of the elongate element when the portion of the elongate element is located in the groove.

Preferably, the second connector comprises a body and a through-hole in the body of the second connector provides the pivot axis of the second connector. More preferably, the through-hole is a groove in the body of the second connector. Still more preferably, the first limb comprises a transverse portion that is orthogonal to a longitudinal axis of the first limb, the transverse portion of the first limb is located in the through-hole of the body of the second connector, the second limb is attached to the body of the second connector, and the body of the second connector comprises the restrictor, the restrictor being an abutment against which a portion of the first limb abuts to prevent relative rotation of the first limb with respect to the second limb beyond the limit position. Alternatively, the second limb comprises a transverse portion that is orthogonal to a longitudinal axis of the second limb, the transverse portion of the second limb is located in the through-hole of the body of the second connector, the first limb is attached to the body of the second connector, and the body of the second connector comprises the restrictor, the restrictor being an abutment against which a portion of the second limb abuts to prevent relative rotation of the first limb with respect to the second limb beyond the limit position.

Preferably, the first support device is electrically insulated from the second limb. More preferably, the second connector electrically insulates the first support device and first limb from the second limb and the first connector.

Preferably, at least one of the first connector and the second connector comprises a body with two grooves that are mutually orthogonal and non-intersecting.

Preferably, the first limb comprises a length of wire and the first support device is integrally formed in a distal end of the first limb, the distal end being remote from the second connector.

Preferably, the second limb comprises a length of wire and at least one of the first connector and the second connector is a respective integral pigtail twist in the length of wire at a respective end of the second limb.

In a second aspect the invention may be broadly said to be a method of using an outrigger of the above-mentioned first aspect of the invention or any of its preferences, the method comprising the steps of:

- connecting the second limb to a length portion of a first wire of a post and wire fence by the first connector;
- rotating the second limb about the longitudinal axis of the length portion of the first wire, and in a first direction of rotation, to bring the second limb into an upright position at which the second limb abuts a second wire of the post and wire fence, the second wire being located above the first wire;
- positioning the first limb in its limit position by rotating the first limb with respect to the second limb about the pivot axis of the second connector and in the first direction of rotation; and
- suspending a length portion of an electric fence conductor from the first support device at the distal end of the first limb.

Preferably, the first limb is rotated in a first rotation, in a second direction of rotation that is opposite the first direction of rotation, to move the first support device and the suspended length portion of the electric fence conductor away from a rest position, by an impact against the first support device or the suspended length portion of the electric fence conductor, and is rotated in a second rotation, in the first direction of rotation, to return the first support device and the suspended length portion of the electric fence conductor back to the rest position on cessation of the impact, the first and second rotations being rotations about either the pivot axis of the second connector or the longitudinal axis of the length portion of the first wire.

Preferably, the first support device grips the suspended length portion of the electric fence conductor and thereby resists relative sliding movement of the first support device along the suspended length portion of the electric fence conductor.

The invention may further be said to consist in any alternative combination of parts or features mentioned herein or shown in the accompanying drawings. Known equivalents of these parts or features which are not expressly set out are nevertheless deemed to be included.

The term 'comprising' as used in this specification, or in the accompanying claims, means 'consisting at least in part of'. When interpreting each statement in this specification, or in the accompanying claims, that includes the term 'comprising', features other than that or those prefaced by the term may also be present. Related terms such as 'comprise' and 'comprises' are to be interpreted in the same manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

As used herein the term "(s)" following a noun means the plural and/or singular form of that noun.

As used herein the term "and/or" means "and" or "or", or where the context allows both.

The invention consists in the foregoing and also envisages constructions of which the following gives examples only.

BRIEF DESCRIPTION OF THE DRAWINGS

Preferred embodiments and methods of utilising the invention will be further described, with reference to the accompanying figures, by way of example only and without intending to be limiting, wherein.

DETAILED DESCRIPTION OF PREFERRED EMBODIMENTS

Referring to the figures it will be appreciated that the invention may be implemented in various forms and modes. The following description of preferred embodiments of the invention is given by way of example only.

Figure 1:
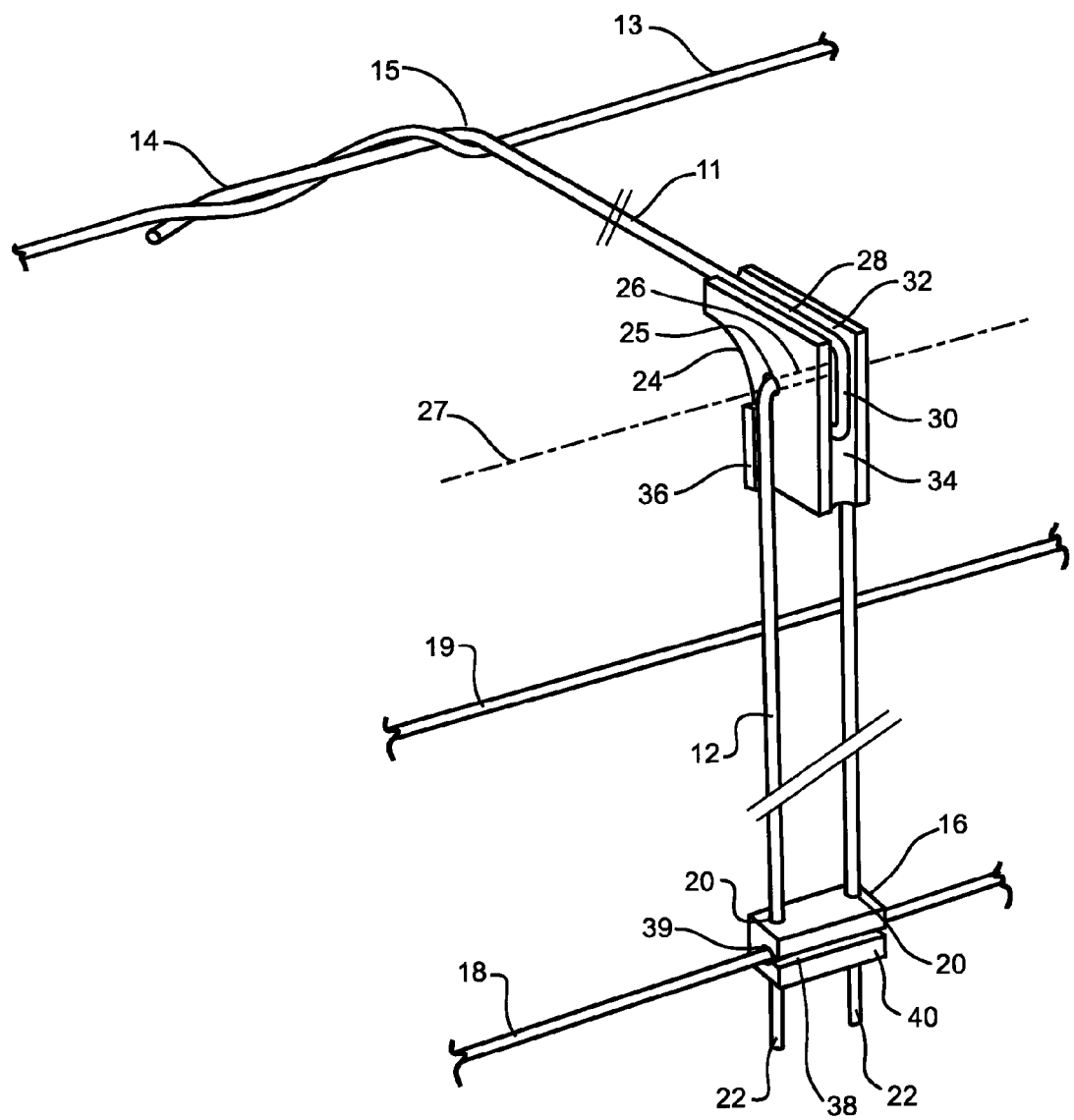
FIG. 1 shows a perspective view of a first embodiment of a double pivot outrigger supported by fence wires and in a rest position.
Figure 2:
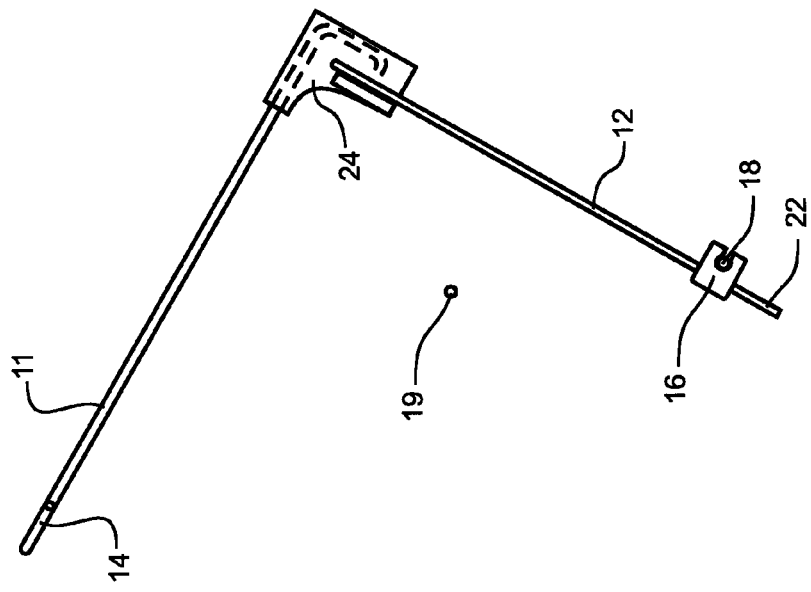
FIG. 2 shows a first side view of the outrigger of FIG. 1 in the rest position.
Figure 3:
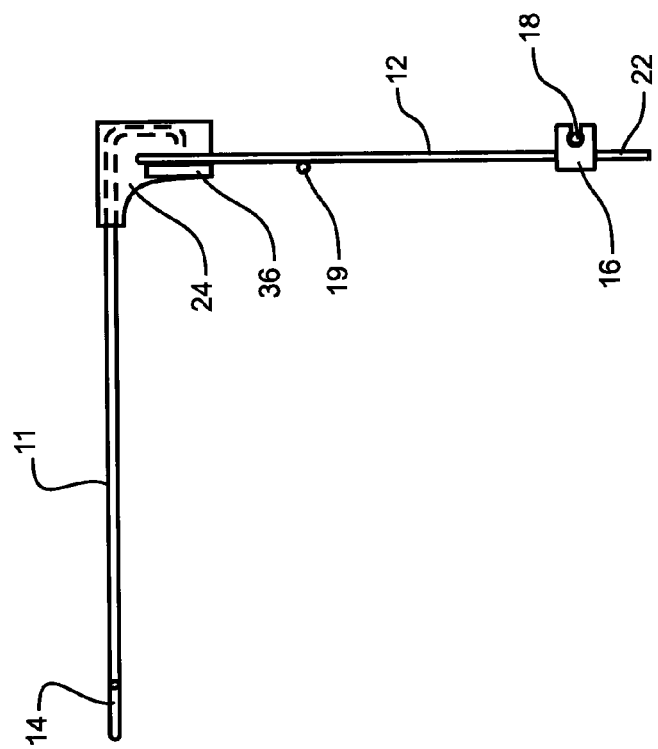
FIG. 3 shows a second side view of the outrigger of FIG. 1 in a first pivoted position.
Figure 4:
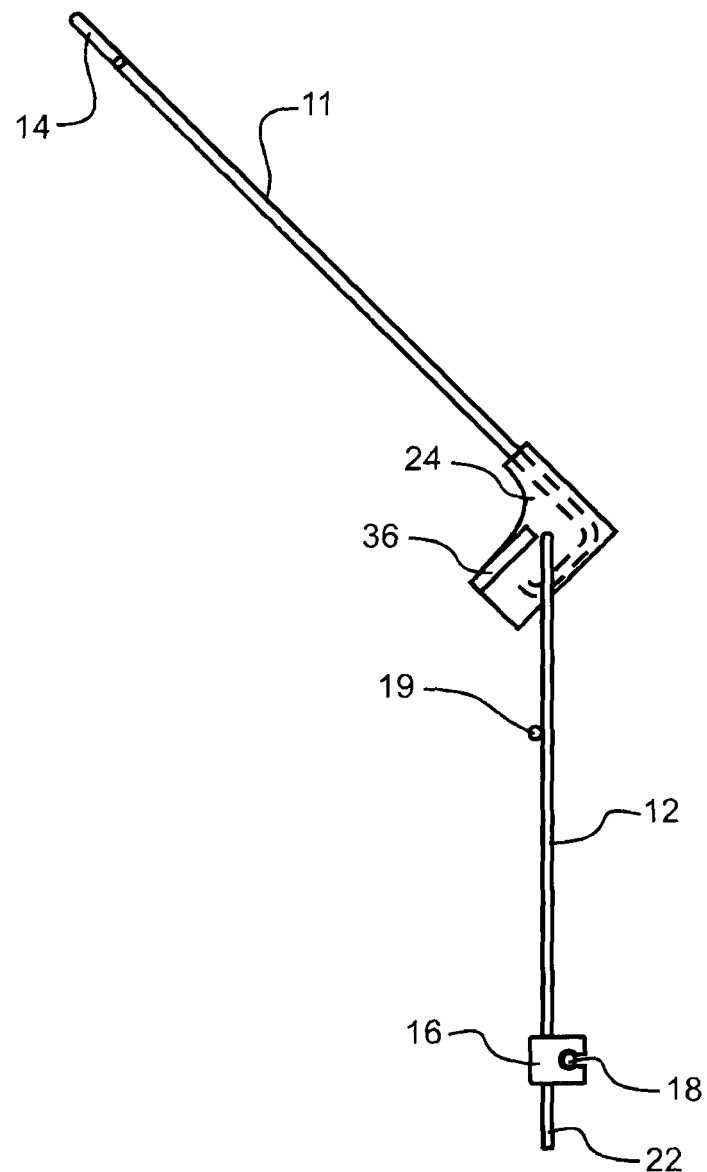
FIG. 4 shows a third side view of the outrigger of FIG. 1 in a second pivoted position.
Figures 5, 6:
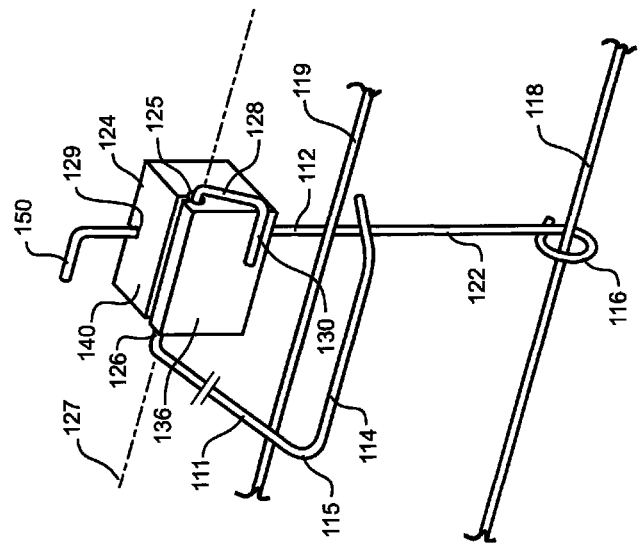
FIG. 5 shows a perspective view of a second embodiment of a double pivot outrigger supported by fence wires and in a rest position.
FIG. 6 shows a perspective view of a third embodiment of a double pivot outrigger supported by fence wires and in a rest position.

FIGS. 1, 5 and 6 each show a perspective view of respective embodiments of an outrigger, according to the present invention. The outrigger is supported by wires of a fence. FIGS. 2, 3 and 4 show side views of the outrigger of FIG. 1, as seen looking along the line of the supporting fence by which the outrigger is supported. Only the generally horizontal fence wires of the supporting fence are shown in FIGS. 1 to 4; other components of the supporting fence, for example posts and battens, being omitted for clarity.

FIG. 1 shows a perspective view of a double-pivoted electric fence outrigger in accordance with the invention. In use, the outrigger is supported by fence wires and resiliently supports an electric fence conductor at a rest position that is offset at a distance outward from one side of the supporting fence.

The outrigger has a first elongate limb 11 and a second elongate limb 12. An elongate electric conductor 13 is suspended from a first support device 14 located at a distal end 15 of the first limb 11. FIG. 1 shows the electric conductor as a single strand of wire, for example a galvanised steel wire. Alternatively, the electric conductor is a multi-stranded wire, or is made from one or more wire strands that are twisted, braided or woven together, optionally with non-conductive supporting strands, into a rope, tape or braid. The wire strands are advantageously made from stainless steel or tinned copper, and are advantageously supported by a woven or braided polyethylene material.

In the embodiment shown in FIG. 1, the first support device 14 is a transverse extension that extends substantially perpendicularly from the first limb 11. The first limb is formed from a length of steel wire, preferably galvanised, and the extension formed integrally with the limb by forming an approximately 90° bend in the wire. The electric conductor 13 is wrapped around the extension. A distal tip portion of the extension is bent inward to help engage and retain the wrapped electric conductor about the extension. Tension in the electric conductor causes the electric conductor to grip the transverse extension and thereby resist movement of the first limb relative to the electric conductor, in a direction along the electric conductor.

Other support devices (not shown in the figures), for example a pigtail twist in the wire of the first limb, may be used for suspending the electric conductor from the outer end of the first limb of the outrigger.

In the preferred embodiment shown in FIG. 1, the first support device 14 extends substantially perpendicular to the elongate first limb 11. The tension in the electric conductor 13, and the resulting grip of the transverse extension by the electric conductor, holds the first limb 11 substantially perpendicular to the electric conductor 13.

In use, the second limb 12 is attached by a first connector 16 to a length portion of an elongate element, for example a wire 18. The wire 18 is the lower wire of a pair of wires. The lower wire 18 and a higher wire 19 are generally parallel and horizontal wires of a supporting fence. Typically the fence is a wire, post and batten fence.

The first connector 16 has through-holes 20 in which a respective portion of tail ends 22 of the second limb 12 are located. The relative dimensions of the through-holes and the tail ends are such that the first connector 16 grips the tail ends but permits the first connector to be slid along the tail ends when sufficient force is applied to overcome the grip.

The second limb 12 is formed from a length of steel wire, preferably galvanised. The second limb 12 has a transverse portion 26 (shown by broken lines in FIG. 1) that is formed integrally with the tail ends 22 of the limb by forming two approximately 90° bends in the wire.

The first limb 11 is connected to the second limb 12 by a second connector 24 that is spaced apart from the first connector 16. The distance between the first and second connectors can be adjusted by sliding the first connector along the tail end of the second limb.

The second connector 24 has a straight through-hole 25. A longitudinal axis of the through-hole defines a pivot axis 27 of the second connector.

The transverse portion 26 of the second limb 12 extends, with a clearance, through the through-hole 25 in the second connector 24, allowing both the first limb 11 and the second connector 24 to be rotatable with respect to the second limb 12 about the pivot axis 27.

The first limb 11 is attached to the second connector 24 so that pivot axis 27 of the second connector is transverse to a longitudinal axis of the first limb 11. In the embodiment shown in FIG. 1, the first limb 11 has an end portion 28 and a transverse return portion 30 at a proximal end of the first limb, opposite the distal end 15. The end portion 28 and the return portion 30 are located in respective grooves or channels 32 and 34 in the second connector 24 to securely fasten the proximal end of the first limb to the second connector so that the first support device 14 is substantially parallel to the pivot axis 27 of the second connector and, therefore, to the axis of rotation of the first limb 11 relative to the second limb 12.

The second connector 24 has a shoulder 36 against which the second limb 12 abuts to limit rotation of the first limb 11 with respect to the second limb 12 about the pivot axis 27 of the second connector. The shoulder prevents relative rotation of the first limb in one direction of rotation toward the second limb beyond a limit position.

FIG. 1 shows the first limb 11 in the limit position. The second limb 12 is shown abutting the shoulder 36 thereby restricting further anti-clockwise rotation (as seen in FIG. 1) of the first limb 11 relative to the second limb 12. In this limit position, the first limb 11 is substantially horizontal and perpendicular to the substantially vertical second limb 12.

In the embodiment shown in FIG. 1, the first connector 16 is made from a slightly resilient material and has a groove or channel 38. The second limb 12 is connected to, and thereby supported by, the lower wire 18 by locating the length portion of the lower wire 18 in the groove or channel 38. The groove or channel 38 is provided in the form of a straight through-hole 39 of slightly larger diameter than the diameter of the lower wire 18, the through-hole 39 opening along its full length to an outer face 40 of the first connector 16, and the opening having a width that is slightly shorter than the diameter of the lower wire. This arrangement allows the lower fence wire 18 to be forced, in a radial direction, through the opening and into the through-hole 39 of the groove or channel 38 in the first connector 16. The first connector is then captive on, but freely rotatable about, the lower fence wire 18.

The electric conductor 13 is electrically insulated from the supporting lower fence wire 18. In the embodiment shown in FIG. 1, both the first connector 16 and the second connector 24 are made of electrically insulating material, for example moulded from a plastics material. The first connector 16 electrically insulates the second limb 12 from the lower fence wire 18, and the second connector 24 electrically insulates the second limb 12 from the first limb 11, the support device 14, and the electric conductor 13 suspended from the outrigger.

FIGS. 2, 3, and 4 show respective side views of the outrigger of FIG. 1, in a rest position, in a first pivoted position, and in a second pivoted position. The outrigger is attached by the first connector 16 to a lower wire 18 of a fence.

The weight of the first limb 11 and the weight of, and tension in, the portion of the electric conductor 13 (not shown in FIGS. 2, 3 and 4) suspended from the support device 14, pull the distal end 15 of the first limb downward, rotating the first limb anti-clockwise (as seen in FIGS. 2, 3, and 4) about the pivot axis 27 of the second connector 24 until the shoulder 36 abuts the second limb 12.

The abutment of the shoulder 36 against the second limb 12 rotates the second limb anticlockwise (as seen in FIGS. 2, 3 and 4) about the longitudinal axis of the lower fence wire 18 until the second limb 12 abuts upper fence wire 19.

In this position, the second limb 12 is substantially vertical and the first limb is substantially horizontal, as shown in FIGS. 1 and 2.

When the electric conductor 13, or the support device 14, or the distal end 15 of the first limb 11, is impacted, for example by a farm vehicle or animal, the outrigger moves away from the rest position shown in FIGS. 1 and 2, for example to the position shown in FIG. 3 or 4.

An inward impact which is substantially horizontal, rotates the first and second limbs together, about the longitudinal axis of the lower fence wire 18, to the position shown in FIG. 3 in which the second limb 12 is no longer in contact with the upper wire 19. The shoulder 36 and the second limb 12 may remain in abutment with one another.

An upward impact lifts the distal end 15 of the first outrigger limb 11 and rotates the first limb clockwise about the pivot axis 27 of the second connector 24, so that the shoulder 36 no longer abuts the second limb 12, to the position shown in FIG. 4. The second limb may remain in contact against the upper wire 19.

On cessation or removal of the impact, the outrigger and the suspended electric conductor move back to their initial rest positions shown in FIGS. 1 and 2.

Figure 7:
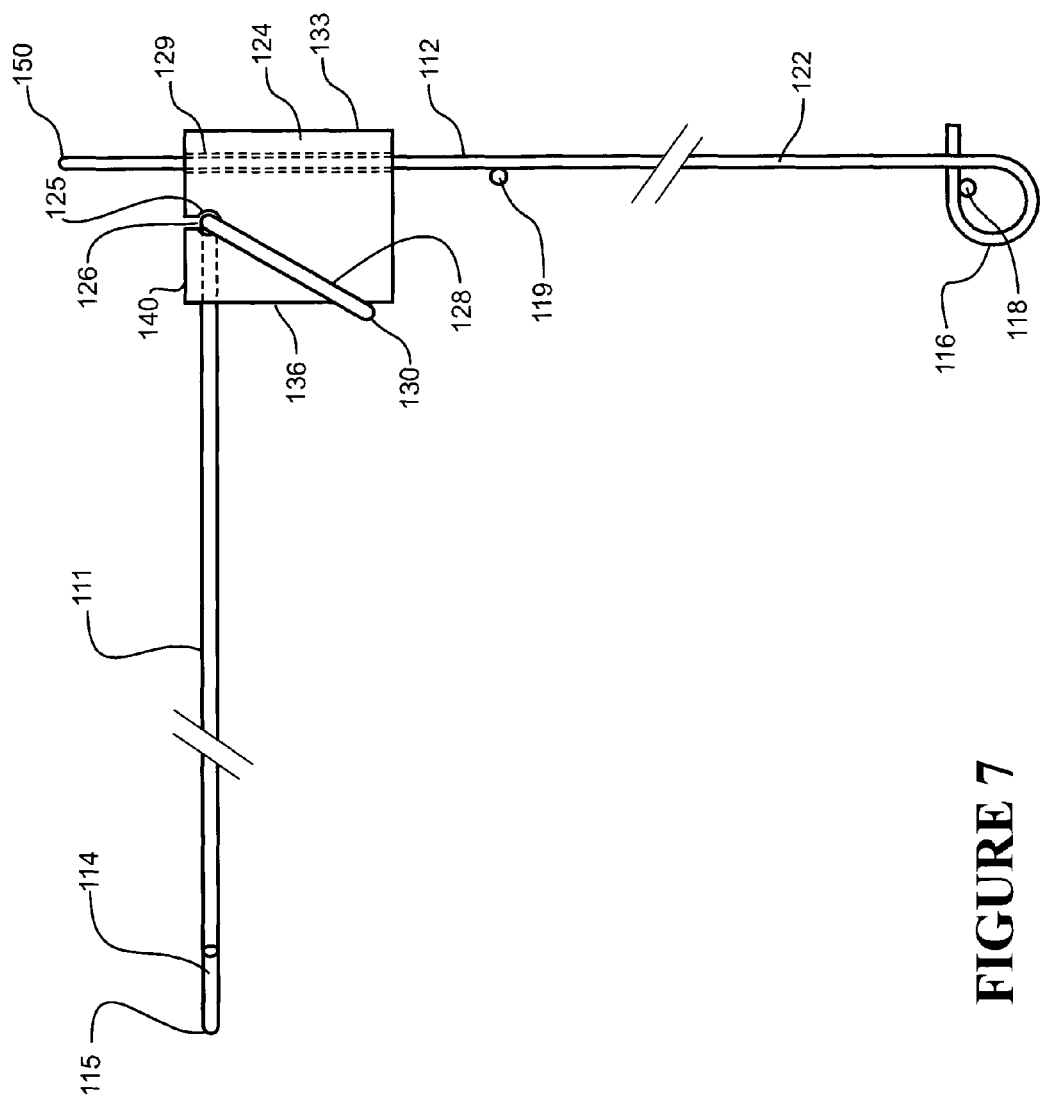
FIG. 7 shows a side view of the second and third embodiments shown in FIGS. 5 and 6 in the rest position.

FIGS. 5 and 6 respectively show perspective views of second and third embodiments of an outrigger according to the present invention. FIG. 7 shows a side view of these embodiments.

The outriggers shown in FIGS. 5, 6 and 7 each have a first elongate limb 111 and a second elongate limb 112. An elongate electric conductor (not shown) is suspended from a support device 114 that extends transversely from a distal end 115 of the first limb 111, similarly to the embodiment described above and shown in FIG. 1.

The support device 114 preferably extends substantially perpendicularly from the distal end 115 of the first limb. In use of the outrigger, the electric conductor (not shown in FIGS. 5, 6 and 7) is wrapped around the support device. A distal tip portion of the support device is bent inward to help engage and retain the wrapped electric conductor about the support device. Tension in the electric conductor causes the electric conductor to grip the support device and thereby resist movement of the first limb relative to the electric conductor, in a direction along the electric conductor.

A first extension 126 extends substantially perpendicularly from a proximal end of the first limb 111, opposite the distal end 115. A second extension 128 extends substantially perpendicularly from the first extension, and a third extension 130 extends substantially perpendicularly from the second extension.

As best seen in the side view of FIG. 7, the second extension 128 is not parallel to the first limb 111, but extends downward and away from the first extension 126, when the first limb is horizontal. The third extension 130 is substantially parallel to the first extension 126.

The first limb is formed from a length of steel wire, preferably galvanised. The support device and the first, second and third extensions are formed integrally with the first limb by forming respective approximately 90° bends in the wire.

The second limb 112 is attached by a first connector 116 to a length portion of the lower fence wire 118 of a pair of fences wires. The lower wire 118 and a higher wire 119 are generally parallel and horizontal wires of a supporting fence. The second limb is formed of a length of steel wire, preferably galvanised, and the first connector 116 is formed integrally with the second limb by forming a pigtail-like twist in one end of the wire, at a distal end of a tail 122 of the second limb. The second limb is rotatably connected to the lower fence wire 118 by loose encirclement of the pigtail twist about the lower fence wire.

The first limb 111 is connected to the second limb 112 by a second connector 124 that is spaced apart from the first connector 116. The distance between the first and second connectors can be adjusted by sliding the second connector 124 along the tail end 122 of the second limb.

The second connector 124 has a first straight through-hole 125. A longitudinal axis of the through-hole defines a pivot axis 127 of the second connector. The first extension 126 of the first limb 111 extends, with a clearance, through the through-hole 125 in the second connector 124, allowing the first limb 111 to rotate with respect to the second limb 112 about the pivot axis 127 which is substantially perpendicular to the longitudinal axis of the first limb 111.

The through-hole 125 opens along its full length to an outer face 140 of the second connector 124, and the opening has a width that is slightly shorter than the diameter of the wire forming the first extension 126. The second connector 124 is made from a slightly resilient material. The resilience allows the first extension 126 to be forced, in a radial direction, through the narrow opening and into the larger through-hole 125 in the second connector 124. The first limb is then held captive by, but is freely rotatable about pivot axis 127 relative to, the second connector 124.

FIGS. 5, 6 and 7 show the first limb 111 in a limit position at which the free rotation of the first limb 111 about pivot axis 127 relative to the second connector 124 is restricted by abutment of the third extension 130 against a face 136 of the second connector 124. The abutment restricts further anti-clockwise rotation (as seen in FIG. 7) of the first limb 111 relative to the second limb 112. In this limit position, the first limb 111 is substantially horizontal and perpendicular when the second limb 112 is substantially vertical.

The second connector has a second straight through-hole 129 which is orthogonal to the first through-hole 125. The second limb extends through the through-hole 129 in the second connector 124. The through-hole 129 is opens along its full length to an outer face 133 of the second connector 124 to form a groove. The groove opening has a transverse width that is slightly shorter than the diameter of the wire forming the second limb. The orthogonal first and second through-holes 125 and 129 are non-intersecting to maintain electrical isolation between the first and second limbs 111 and 112.

The resilience of the second connector allows the second limb to be forced, in a radial direction, through the narrow opening and into the relatively larger through-hole 129 in the second connector 124. The first limb is then held captive by, but is slidable along the tail 122 of the second limb to adjust the spacing between the first and second connectors to suit the spacing between the upper and lower fence wires 118 and 119. The spacing between the first and second connectors is adjusted to place the second connector 124 clear above the upper fence wire 119 when the outrigger is in its rest position, as shown in FIGS. 5, 6 and 7.

The relative dimensions of the through-hole 129 and the tail end 122 of the second limb are such that the second connector 124 grips the tail end 122 but permits the second connector to be slid along the tail end when sufficient force is applied to overcome the grip.

The second limb has a transversely extending portion 150 at the end of the second limb opposite the first connector 116. This provides an end stop that limits the range of sliding movement of the second connector along the first limb and helps to retain the second connector in engagement with the through-hole 129.

In the embodiment shown in FIG. 5, the second limb 112 has a second tail end 122A that is substantially parallel to the first tail end 122 and is located in a third through-hole 129A in the second connector 124. The two tail ends 122 and 122A are linked together by the transverse portion 150 of the second limb.

The two tail ends maintain the orientation of the second limb and the first connector relative to the pivot axis of the second connector, and therefore to the longitudinal axis of an electric conductor when supported from the support device 114.

The double-pivot outriggers described above are connected to the lower of two substantially horizontal wires of a post and wire fence, the second limb rotated into an upright position with the to bring the second limb into abutment with the higher of the two fence wires. The first limb is rotated, in the same direction of rotation as the second limb, to place the first limb in a limit position at which part of the first or second limb is in abutment with the shoulder, surface or other restriction of the second connector. An electrified conductor can then be suspended from the support device at the distal end of the first limb, in a rest position that is outward from the wires of the fence.

An impact against the first support device or against the suspended length electrified conductor rotates the first limb in an opposite direction of rotation to that described in the immediately preceding paragraph, firstly to move the first support device and the suspended electrified conductor away from the rest position, by an impact against the first support device or the suspended length portion of the electric fence conductor, and second to return the first support device and the suspended length portion of the electric fence conductor back to the rest position on cessation of the impact. The rotations may be either about the pivot axis of the second connector or about the longitudinal axis of the lower fence wire.

Electrical isolation between the lower supporting fence wire and the electric conductor suspended at the distal end of the first limb of the outrigger may be provided by covering the support device with an electrically insulating sleeve or coating (not shown).

Figure 8:
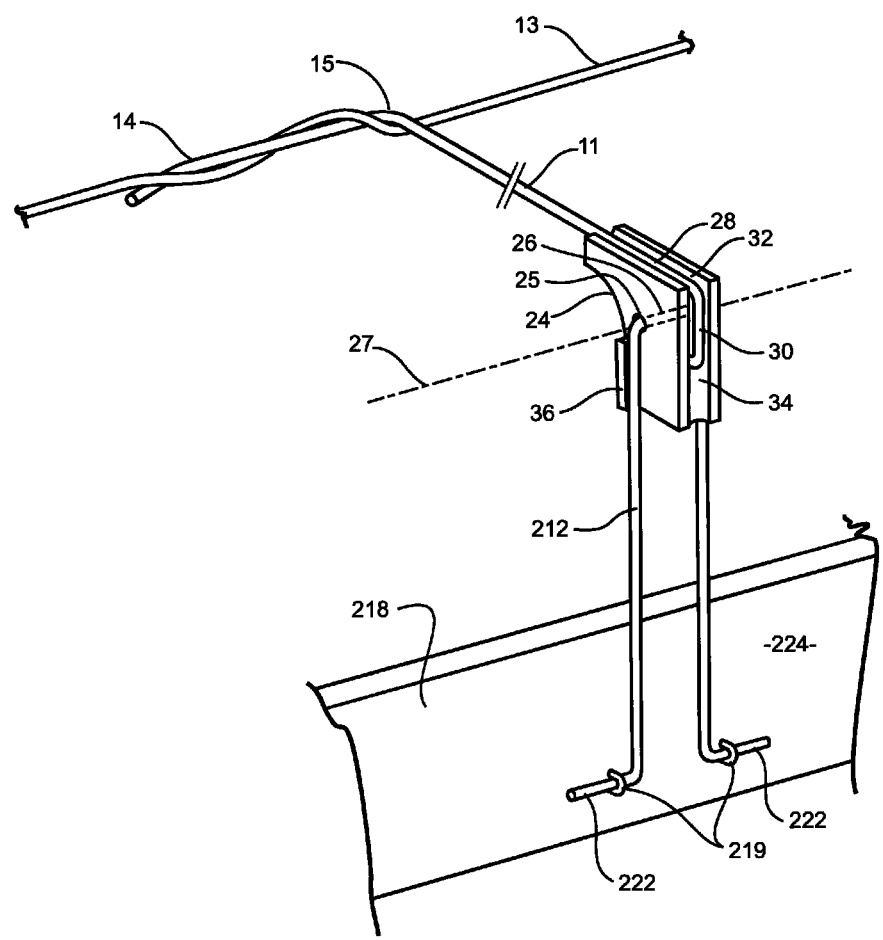
FIG. 8 shows a perspective view of a fourth embodiment of a double pivot outrigger supported by fence rail and in a rest position.
Figure 9:
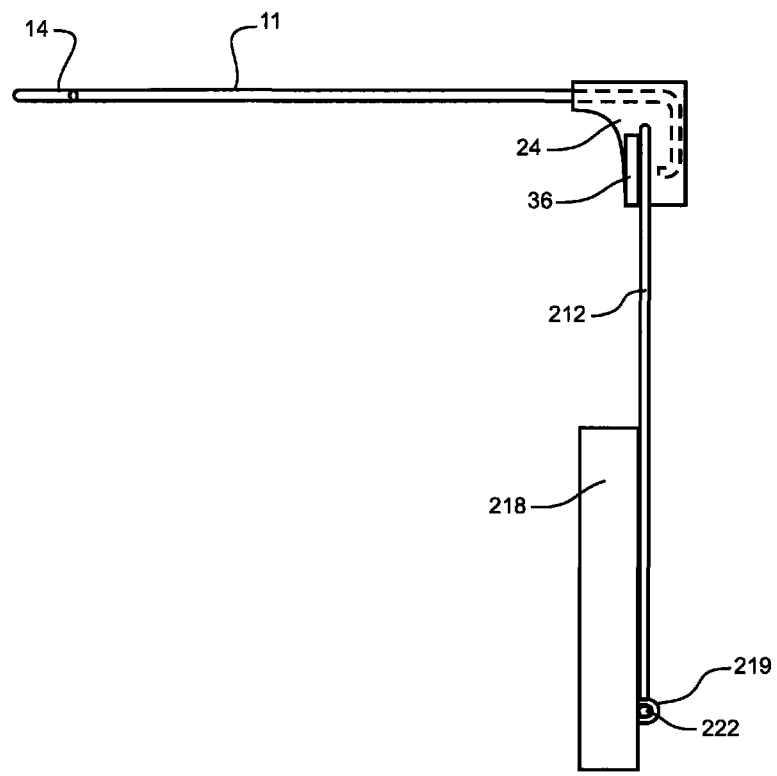
FIG. 9 shows a side view of the outrigger of FIG. 8 in the rest position.

FIG. 8 shows a perspective view, and FIG. 9 shows a side view, of a fourth embodiment of a double pivot outrigger supported by fence rail 218 and in a rest position. This embodiment is a variation of the first embodiment shown in FIGS. 1 to 4 and is labelled in FIGS. 8 and 9 with like labels denoting like features. In place of the connection made by the first connector 16 of the first embodiment, a second limb 212 of the fourth embodiment is attached to a length portion of an elongate element, for example a generally horizontal rail 218 of a post and rail fence. The tail ends 222 of the second limb 212 of the fourth embodiment are bent outward away from, but into alignment with, one another. The tail ends 222 are attached to a side face 224 of the fence rail 218, and preferably to a lower portion of the side face, by a pair of U-shaped staples 219. The second limb 212, and therefore the outrigger, is rotatable about the axis formed by the capture of the end tails 222 by the staples 219, to allow the outrigger act in the manner described above. The axis is substantially parallel to the longitudinal axis of the fence rail. In the outrigger rest position as shown in FIGS. 8 and 9, the second limb 212 rests substantially vertically against the side face 224 of the rail 218, and particularly against the upper portion of that side face.

The fourth embodiment operates similarly to the first embodiment described above, with the first limb 11 pivoting about either or both of the axis defined by the U-shaped staples 219 and the axis 27 of the second connector 24.

Figure 10:
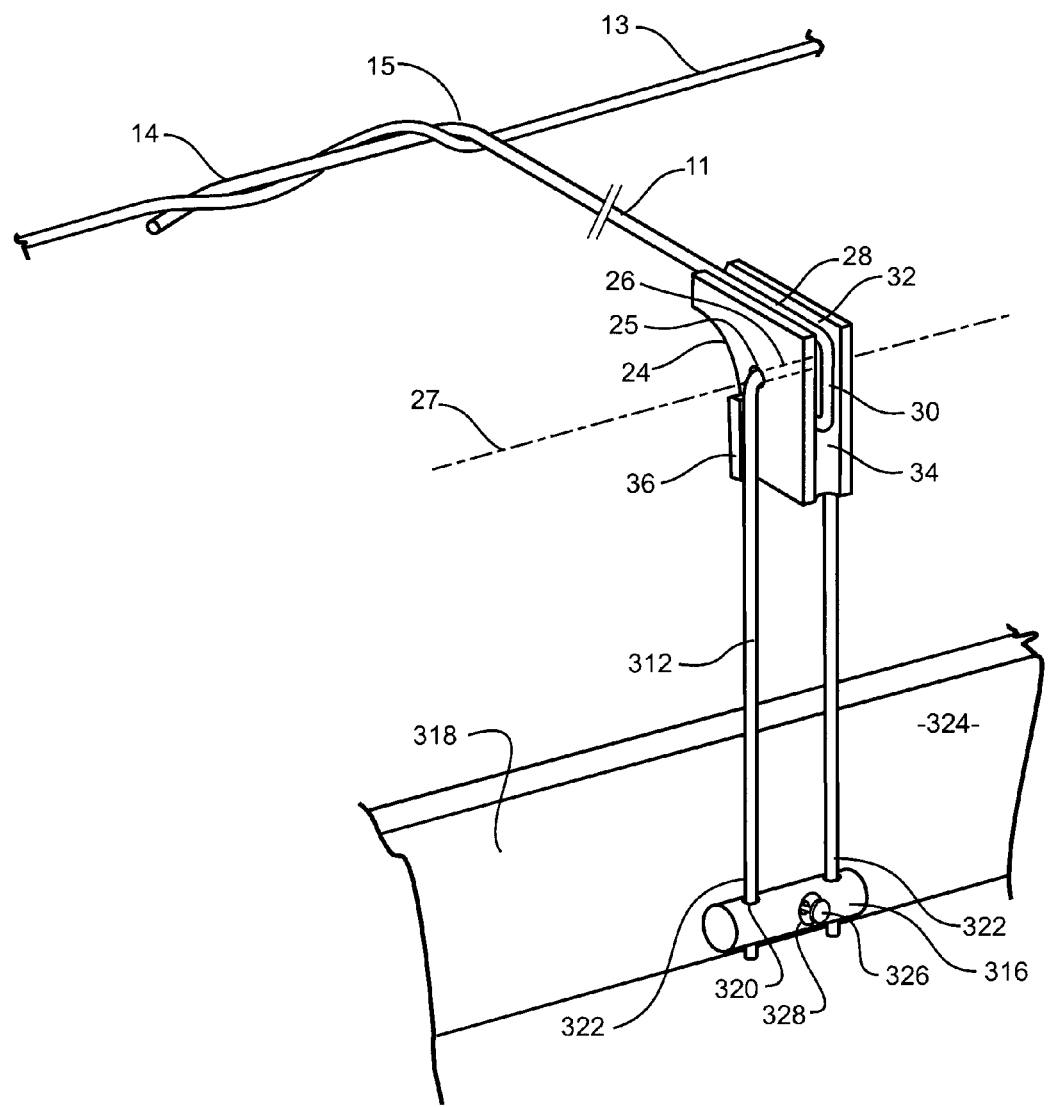
FIG. 10 shows a perspective view of a fifth embodiment of a double pivot outrigger supported by fence rail and in a rest position.
Figure 11:
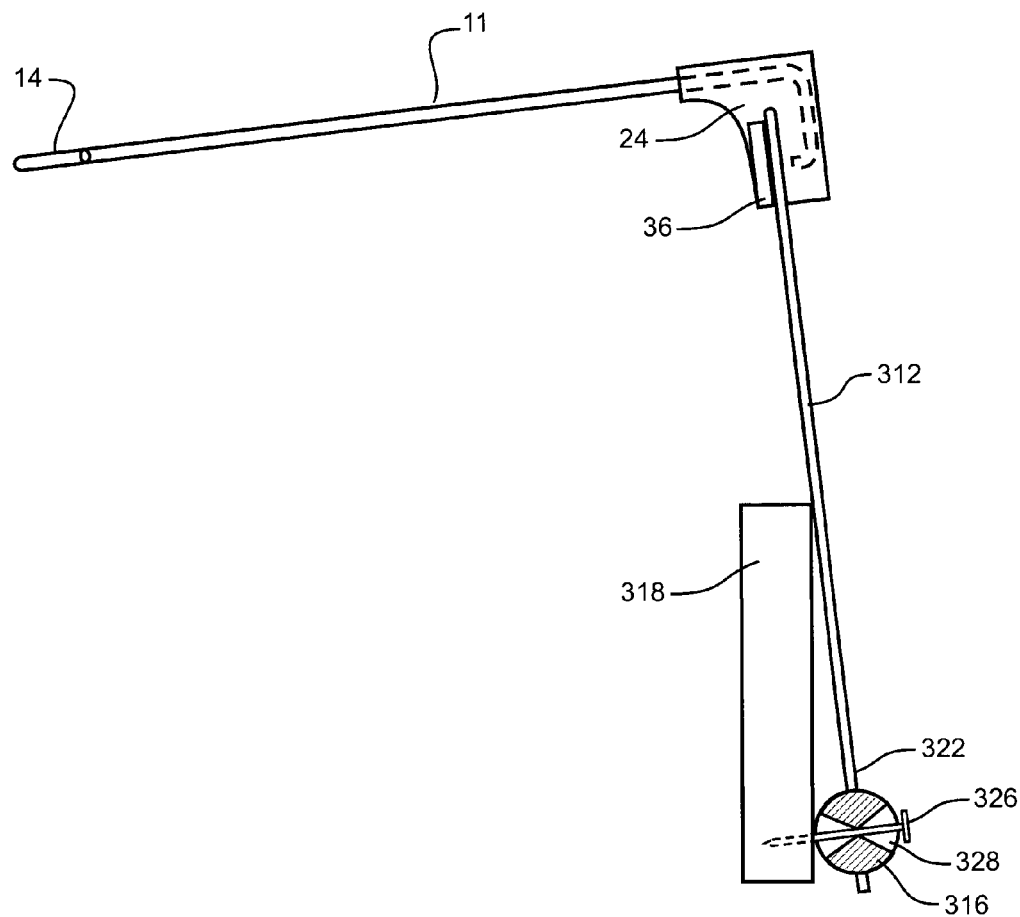
FIG. 11 shows a side view of the outrigger of FIG. 10 in the rest position.

FIG. 10 shows a perspective view, and FIG. 11 shows a side view, of a fifth embodiment of a double pivot outrigger supported by fence rail 218 and in a rest position. This embodiment is a variation of the first and fourth embodiments shown in FIGS. 1 to 4, 8 and 9 and is labelled in FIGS. 10 and 11 with like labels denoting like features.

In place of the first connector 16 of the first embodiment, the fifth embodiment uses a first connector 316 which attaches a second limb 312 to a length portion of an elongate element, for example a generally horizontal rail 318 of a post and rail fence. The tail ends 322 of the second limb 312 of the fifth embodiment are engaged in respective through-holes 320. The outrigger is supported on the fence by attachment of the first connector 316 to a side face 324 of the fence rail 318, and preferably to a lower portion of the side face.

The connector 316 is nailed to the fence rail by a nail 326 that passes through a waisted through-hole 328 in the connector. The waisted through-hole has a relatively small diameter in the middle of the connector body and widens to a relatively large diameter at each side of the connector. Alternatively, (but not shown in the figures) the waisted through-hole may have a relatively small diameter at one side of the connector and widen to a relatively large diameter at the other side of the connector. The waisted through-hole allows the connector to rotate about a horizontal axis perpendicular to the nail and substantially parallel to a longitudinal axis of the fence rail.

The second limb 312, and therefore the outrigger, is rotatable about the axis formed by the waisted through-hole, to allow the outrigger to act in the manner described above. The axis is substantially parallel to the longitudinal axis of the fence rail. In the outrigger rest position as shown in FIGS. 10 and 11, the second limb 312 rests in an upright orientation against the upper portion of the side face 224 of the rail 218.

The outrigger limbs described above are preferably made from metal and are suitably made from galvanised high-tensile steel wire, but can be made from a plastics or other electrically insulating material.

The electric fence conductor is typically a single wire strand, e.g. a galvanised steel wire, or is a multi-stranded wire, or is made from one or more wire strands twisted, braided or woven with non-conductive supporting strands into a rope, tape or braid. The wire strands are advantageously made from stainless steel or tinned copper, and are advantageously supported by a woven or braided polyethylene material.

Outriggers as described above can be added to a traditional post, batten and wire farm fence to carry electrified wires or other conductors offset outward from either one or both sides of the fence. The electrified conductors deter stock from coming into contact with the supporting fence. The outriggers and the electrified conductors can move back when impacted by stock or by farm vehicles. This reduces the likelihood of such impacts mis-shaping the outriggers or otherwise damaging the outriggers or the electrified conductors or the support fence itself, reducing the likelihood of inadvertent earthing or grounding of the electrified fence which can affect its effectiveness.

In another application, the outriggers are used to control one or more animals at a feeding zone. At least one outrigger according to the invention is supported by a pair of generally horizontal wires. An electrified conductor, such as an electric fence wire or tape, is suspended from an outer end of the outrigger to extend over the feeding zone. The electrified conductor is held at a height above the feeding zone that allows an animal holding its head down in a feeding posture to consume feed located at the feeding zone, but deters an animal at the feeding zone from raising its head substantially above a feeding posture or walking onto the feeding zone.

The outriggers suspend the electrified wire at a height at which the wire will contact an animal if it walks onto the feed. A suitable height for the electrified wire is just below the animal's backline or withers. At this height, the electrified wire allows feeding animals eating at the feeding zone to have full unrestricted feeding movement. But, if an animal attempts to walk onto or along the feeding zone, the animal will touch the suspended electrified wire causing the animal to receive a shock, causing the animal to move away.

Some previously-known feedlot control arrangements have used electrified wires at lower heights. In these arrangements, the increased likelihood of animals being shocked while feeding has resulted in shy feeders. The likelihood of causing shy feeders can be reduced by using electrified wires suspended at a height just below the animal's backline, from outriggers according to the invention. This helps keep animals substantially outside the perimeter of the feeding zone and reduces spoilage of the feed by trampling, defecating or urinating by the animal on the feed. The outrigger or electric wire, if impacted by an animal, moves away from its rest position with no, or only temporary, deformation and without being damaged, and can then return back to its rest position after the animal has recoiled from the electric shock.

The animal feeding control system allows a feed pad or other zone to be substantially unencumbered by the bails or troughs and the like that have been traditionally used to try prevent spoilage of feed prior to its consumption. The unencumbered feed pad can then be more easily cleared and cleaned, when required. The electrified conductors can be suspended from several outriggers, according to the present invention, that are supported by a pair of generally horizontal wires tensioned between two or more upright support posts. All parts of the feeding control system, other than the posts, are held above the pad making cleaning of the feed pad relatively straightforward.

The foregoing describes the invention with reference to preferred embodiments. Alterations and modifications as will be obvious to those skilled in the art are intended to be incorporated within the scope of the invention as defined in the accompanying claims. The disclosures and the descriptions herein are purely illustrative and are not intended to be in any sense limiting.

For example, the pigtail twist shown as the first connector 116 of the embodiments shown in FIGS. 5, 6 and 7 can be substituted by a connector identical to the second connector 124, and the lower fence wire 118 engaged in the through hole 125 to provide a pivotable connection of the second limb 112 to the lower fence wire 118.

What I claim is:

1. An outrigger for supporting an elongate electrical conductor at a distance outward from a support, the outrigger comprising:
    a first elongate limb;
    a first support device at a distal end of the first elongate limb for suspending therefrom a length portion of the elongate electrical conductor;
    a second elongate limb;
    a first connector attached to, or integral with, the second elongate limb for connecting the second elongate limb to a length portion of an elongate element of the support so that the second elongate limb is rotatable about an axis that is parallel to a longitudinal axis of the length portion of the elongate element, when the second elongate limb is connected to the length portion of the elongate element of the support;
    a second connector pivotably connecting the first elongate limb to the second elongate limb, the first elongate limb being rotatable with respect to the second elongate limb about a pivot axis defined by a through-hole in a body of the second connector for receiving the second elongate limb when the second elongate limb is connected to the length portion of the elongate element of the support, the pivot axis being transverse to both the first elongate limb and the second elongate limb;
    the first connector or the second connector having a through-hole for receiving the second elongate limb such that said first connector or second connector is slidable along the second elongate limb so that the distance between the first and second connectors is adjustable; and
    a restrictor comprising an abutment disposed on the body of the second connector, the restrictor permitting rotation of the first elongate limb with respect to the second elongate limb about the pivot axis, but preventing relative rotation of the first elongate limb in one direction of rotation toward the second elongate limb beyond a limit position by the first elongate limb or the second elongate limb abutting against the restrictor.

2. An outrigger as claimed in claim 1, wherein the limit position of the first elongate limb is at least approximately orthogonal to the second elongate limb.

3. An outrigger as claimed in claim 1, wherein the pivot axis of the second connector is substantially parallel to the longitudinal axis of the length portion of the elongate element when the second elongate limb is connected by the first connector to the portion of the elongate element.

4. An outrigger as claimed in claim 1, wherein the first connector comprises a body, the second elongate limb is attached to the body of the first connector, and the portion of the elongate element is locatable in a groove in the body of the first connector, so that the body of the first connector and the second elongate limb are rotatable about the longitudinal axis of the length portion of the elongate element when the portion of the elongate element is located in the groove.

5. An outrigger as claimed in claim 1, wherein the second elongate limb comprises a transverse portion that is orthogonal to a longitudinal axis of the second elongate limb, the transverse portion of the second elongate limb is located in the through-hole of the body of the second connector, the first elongate limb is attached to the body of the second connector.

6. An outrigger as claimed in claim 5, wherein the second connector electrically insulates the first support device and first elongate limb from the second limb and the first connector.

7. An outrigger as claimed in claim 1, wherein the first support device is electrically insulated from the second elongate limb.

8. A method of using an outrigger as claimed in claim 1, the method comprising the steps of:
    connecting the second elongate limb to a length portion of a first wire of a post and wire fence by the first connector;

rotating the second elongate limb about the longitudinal axis of the length portion of the first wire, and in a first direction of rotation, to bring the second elongate limb into an upright position at which the second elongate limb abuts a second wire of the post and wire fence, the second wire being located above the first wire;

positioning the first elongate limb in its limit position by rotating the first elongate limb with respect to the second elongate limb about the pivot axis of the second connector and in the first direction of rotation; and suspending a length portion of an electric fence conductor from the first support device at the distal end of the first elongate limb.

9. A method as claimed in claim 8, wherein the first elongate limb is rotated in a first rotation, in a second direction of rotation that is opposite the first direction of rotation, to move the first support device and the suspended length portion of the electric fence conductor away from a rest position, by an impact against the first support device or the suspended length portion of the electric fence conductor, and is rotated in a second rotation, in the first direction of rotation, to return the first support device and the suspended length portion of the electric fence conductor back to the rest position on cessation of the impact, the first and second rotations being rotations about either the pivot axis of the second connector or the longitudinal axis of the length portion of the first wire.

10. A method as claimed in claim 8, wherein the first support device grips the suspended length portion of the electric fence conductor and thereby resists relative sliding movement of the first support device along the suspended length portion of the electric fence conductor.

* * * * *